US009855515B2

(12) United States Patent
Katyal

(10) Patent No.: US 9,855,515 B2
(45) Date of Patent: Jan. 2, 2018

(54) HORIZONTAL METHOD FOR TRAY DISTILLATION AND OTHER GAS-LIQUID CONTACT OPERATIONS

(71) Applicant: Amit Katyal, New Delhi (IN)

(72) Inventor: Amit Katyal, New Delhi (IN)

( * ) Notice: Subject to any disclaimer, the term of this patent is extended or adjusted under 35 U.S.C. 154(b) by 483 days.

(21) Appl. No.: 14/366,389

(22) PCT Filed: Jan. 7, 2013

(86) PCT No.: PCT/IB2013/050118
§ 371 (c)(1),
(2) Date: Jun. 18, 2014

(87) PCT Pub. No.: WO2013/111023
PCT Pub. Date: Aug. 1, 2013

(65) Prior Publication Data
US 2015/0001038 A1    Jan. 1, 2015

(30) Foreign Application Priority Data

Jan. 25, 2012    (IN) .............................. 224/DEL/2012
Sep. 10, 2012    (IN) ............................ 2798/DEL/2012

(51) Int. Cl.
*B01D 3/14*    (2006.01)
*B01D 3/32*    (2006.01)
(Continued)

(52) U.S. Cl.
CPC ............ *B01D 3/324* (2013.01); *B01D 1/0088* (2013.01); *B01D 1/26* (2013.01); *B01D 3/14* (2013.01); *B01D 3/42* (2013.01); *C10G 7/00* (2013.01)

(58) Field of Classification Search
CPC .......... B01D 1/0088; B01D 1/26; B01D 3/14; B01D 3/146; B01D 3/324; B01D 3/42
See application file for complete search history.

(56) References Cited

U.S. PATENT DOCUMENTS 2,300,985 A * 11/1942 Smith .................... B01D 3/146
159/18
3,373,089 A    3/1968 Vautrain
(Continued)

FOREIGN PATENT DOCUMENTS

WO    97/46298    12/1997

*Primary Examiner* — Jonathan Miller
(74) *Attorney, Agent, or Firm* — Andrew W. Chu; Craft Chu PLLC

(57) ABSTRACT

The present invention discloses a horizontal multi-stage distillation system. The system comprises a feed stream, a distillate stream, a residue stream, a group of vessels, a plurality of vapor non-return valves (NRVs), a plurality of plurality of pumps, a plurality of liquid recycle NRVs, a liquid stream, a vapor stream, a plurality of liquid recycle streams, a plurality of level transmitters, a plurality of flow control valves (FCVs) and a plurality of liquid non-return valves (NRVs). Each vessel is connected to the adjacent vessel. The group of vessels comprises a condenser vessel, a reboiler vessel, a feed vessel, at-least one rectification vessel and at-least one stripping vessel. The present invention provides a horizontal multi-stage distillation system with higher efficiency and operational flexibility compared with equivalent vertical distillation columns. The present invention also avoids the interstage backflow of the liquid and vapors.

18 Claims, 6 Drawing Sheets

(51) Int. Cl.
*B01D 1/00* (2006.01)
*B01D 1/26* (2006.01)
*B01D 3/42* (2006.01)
*C10G 7/00* (2006.01)

(56) References Cited

U.S. PATENT DOCUMENTS

| | | | |
|---|---|---|---|
| 3,575,007 A | 4/1971 | Gunther | |
| 4,259,160 A * | 3/1981 | McClure | B01D 1/2815 159/24.2 |
| 4,276,115 A | 6/1981 | Greenfield | |
| 4,539,076 A * | 9/1985 | Swain | B01D 1/2856 202/154 |
| 5,139,620 A * | 8/1992 | Elmore | B01D 1/221 159/17.1 |
| 5,294,304 A * | 3/1994 | Kano | C07C 29/84 203/19 |
| 6,348,137 B1 * | 2/2002 | Nommensen | B01D 3/141 196/111 |
| 6,485,613 B1 * | 11/2002 | Goorden | B01D 3/02 202/158 |
| 7,297,237 B2 * | 11/2007 | Asano | B01D 3/14 202/154 |
| 7,413,634 B1 * | 8/2008 | Napier | B01D 3/146 159/17.1 |
| 7,922,872 B2 * | 4/2011 | Kihara | B01D 3/146 159/16.1 |
| 9,194,623 B2 * | 11/2015 | Kihara | B01D 59/04 |
| 2002/0053505 A1 | 5/2002 | Arrison | |
| 2008/0264489 A1 * | 10/2008 | Naustdal | B01D 3/18 137/7 |

* cited by examiner

HORIZONTAL METHOD FOR TRAY DISTILLATION AND OTHER GAS-LIQUID CONTACT OPERATIONS

A) TECHNICAL FIELD OF THE INVENTION

The present invention generally relates to a mechanical system incorporating a plurality of electromechanical components and particularly relates to a horizontal multi-stage tray distillation system. The present invention more particularly relates to a horizontal multi-stage tray distillation system with an efficient circulation operation.

B) BACKGROUND OF THE INVENTION

The U.S. Pat. No. 3,373,089 discloses a distillation vessel adapted for horizontal flow therethrough of vapours is equipped with at least one demister element disposed at a substantial angle to the vertical. Also the demister is disposed horizontally. Further the demister section of the vessel contains several demister elements. Further a stair-step demister arrangement is provided, a specific form of which is accomplished by forming the stair-step arrangement employing a screen extended over progressively lower disposed support bars extending across the vessel.

However, the prior arts occupy a large space as well as induce a large capital investment for installation as well as for maintenance. The prior arts also induce a large labour cost involved in troubleshooting. Further the prior arts have an operationally inflexible design which results in difficulty during replacing a damaged part with a new one.

One of the prior art methods discloses a separation of components with different volatilities in vertical multi-stage distillation columns. The vertical multi-stage distillation columns provide a liquid flowing down from the top of the column and vapour rising from bottom of the column. The liquid and vapour of different compositions at different temperatures come in contact with each other on trays placed throughout the height of column with some inter-spacing. Feed to be separated enters the vertical multi-stage distillation column at one of the trays. Further, liquid at a new composition corresponding to the vapour-liquid equilibrium conditions on the tray, flows down to the lower tray which is at a different temperature whereas, vapour at the new composition corresponding to the vapour-liquid equilibrium conditions on the tray rises up to the upper tray which also is at a different temperature. Thus, the liquid and vapour compositions and temperature varies throughout the column height resulting in separation of the mixture.

However, the prior arts occupy a large space as well as induce a large investment for transportation as well as for installation. The prior arts also induce a large labour cost involved in operation, troubleshooting and maintenance. Further, the prior arts fail to overcome a problem of inter-stage backmixing of liquid and vapour.

In the view of foregoing, there is a need for a distillation system with higher efficacy and less installation and maintenance cost. There is also a need for a distillation system to provide easier troubleshooting. Further, there is a need for a distillation system to avoid an inter-stage backmixing of liquid and vapour. Further, there is a need for a distillation system to provide an automated or manual control over overflow of liquid in the stages.

The above mentioned shortcomings, disadvantages and problems are addressed herein, as detailed below.

C) OBJECTS OF THE INVENTION

The primary object of the present invention is to provide a horizontal multi-stage tray distillation system with high efficiency.

Another object of the present invention is to provide a horizontal multi-stage tray distillation system with higher operational flexibility.

Yet another object of the present invention is to provide a horizontal multi-stage tray distillation system for avoiding an inter-stage backflow of the liquid and vapour.

Yet another object of the present invention is to provide a horizontal multi-stage tray distillation system for providing an automated or manual control over overflow of liquid in the stages.

These and other objects and advantages of the embodiments herein will become readily apparent from the following detailed description when considered along with the accompanying drawings.

D) SUMMARY OF THE INVENTION

The present invention discloses a horizontal and segmented multi-stage tray distillation system. The horizontal multi-stage tray distillation system comprises a feed stream, a distillate stream, a residue stream, a group of vessels, a plurality of vapour non-return valves (NRVs), a plurality of pumps, a plurality of liquid recycle NRVs, a liquid stream, a vapour stream, a plurality of liquid recycle streams, a plurality of level transmitters, a plurality of flow control valves (FCVs) and a plurality of liquid non-return valves (NRVs). Each vessel is interconnected with the succeeding and the preceding vessels in the sequence through pipes. The group of vessels comprises a condenser vessel, a reboiler vessel, a feed vessel, at-least one rectification vessel and at-least one stripping vessel. Vapours are generated in the reboiler vessel to increase its pressure. The condensation of vapour in the condenser vessel results in the generation of low pressure in the condenser vessel. At-least one rectification vessel is provided between the feed vessel and the condenser vessel. At-least one stripping vessel is provided between the feed vessel and the reboiler vessel. The reboiler vessel, the condenser vessel, at-least one rectification vessel, at-least one stripping vessel and the feed vessel are interconnected with each other in sequence, so that each of at-least one rectification vessel, at-least one stripping vessel and the feed vessel perform functions equivalent to a single stage of an equivalent vertical tray distillation column. The vapour travel from the reboiler vessel to the condenser vessel through various intermediate vessels because of the pressure differential between the reboiler vessel and the condenser vessel. A reflux flow of liquid under gravity in a vertical tray column is exactly replicated by putting pumps of suitably high rating between each pair of interconnected vessels and operating all the pumps in the sequence simultaneously to transfer liquid within the sequence of vessels from one vessel to the next interconnected vessel. A vapour space is present at the top of each of the vessel which is equivalent to tray interspacing of an equivalent vertical tray distillation column. The tray is placed at the bottom of each of the at-least one rectifying vessels, the at-least one stripping vessel and the feed vessel of the present invention. The vapour stream is connected to the vertical bottom of each of the vessels and fed into these trays from below. Similar to vertical distillation columns, vapour bubble through the liquid present on the trays, attain vapour-liquid equilibrium with the liquid and enter the vessel vapour space of each of the vessels with some loss in pressure. The vapours from the vessel vapour space come out of an opening at the top of the vessel which is connected to the vertical bottom under the tray of the next vessel and enter the next vessel under the tray. The flow control valves (FCV) are installed in the pump discharge lines to regulate liquid flow from the bottom of one vessel to the top downcomer area of the succeeding vessel. Liquid recycle streams recycles the excess liquid flow back from the pump discharges to the vessels on the suction side of the pumps maintaining the pump operations at the best efficiency point, reducing backflow load on the pumps.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

E) BRIEF DESCRIPTION OF THE DRAWINGS

The other objects, features and advantages will occur to those skilled in the art from the following description of the preferred embodiments and the accompanying drawings in which.

F) DETAILED DESCRIPTION OF THE INVENTION

Figure 1:
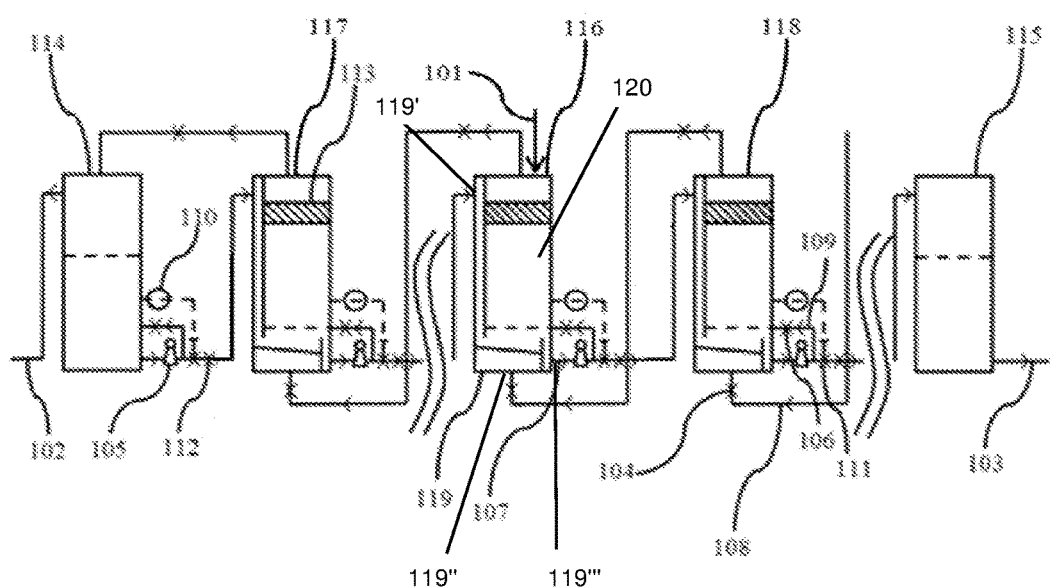
FIG. 1 illustrates a schematic diagram of a horizontal multi-stage distillation system, according to one embodiment of the present invention.

The present invention discloses a horizontal and segmented multi-stage tray distillation system. The horizontal multi-stage tray distillation system comprises a feed stream, a distillate stream, a residue stream, a group of vessels, a plurality of vapour non-return valves (NRVs), a plurality of pumps, a plurality of liquid recycle NRVs, a liquid stream, a vapour stream, a plurality of liquid recycle streams, a plurality of level transmitters, a plurality of flow control valves (FCVs) and a plurality of liquid non-return valves (NRVs). Each vessel is interconnected with the succeeding and the preceding vessels in the sequence through pipes. The group of vessels comprises a condenser vessel, a reboiler vessel, a feed vessel, at-least one rectification vessel and at-least one stripping vessel. Vapours are generated in the reboiler vessel to increase its pressure. The condensation of vapour in the condenser vessel results in the generation of low pressure in the condenser vessel. At-least one rectification vessel is provided between the feed vessel and the condenser vessel. At-least one stripping vessel is provided between the feed vessel and the reboiler vessel. The reboiler vessel, the condenser vessel, at-least one rectification vessel, at-least one stripping vessel and the feed vessel are interconnected with each other in sequence, so that each of the at-least one rectification vessel, each of the at-least one stripping vessel and the feed vessel perform functions equivalent to a single stage of an equivalent vertical tray distillation column. The vapour travel from the reboiler vessel to the condenser vessel through various intermediate vessels because of the pressure differential between the reboiler vessel and the condenser vessel. A reflux flow of liquid under gravity in a vertical tray column is exactly replicated by putting pumps of suitably high rating between each pair of interconnected vessels and operating all the pumps in the sequence simultaneously to transfer liquid within the sequence from one vessel to the next interconnected vessel. A vapour space is present at the top of each of the vessel which is equivalent to tray interspacing of an equivalent vertical tray distillation column. The tray is placed at the bottom of each of the at-least one rectifying vessels, the at-least one stripping vessel and the feed vessel of the present invention. The vapour stream is connected to the vertical bottom of each of the vessels and fed into these trays from below. Similar to vertical distillation columns, vapour bubble through the liquid present on the trays, attain vapour-liquid equilibrium with the liquid and enter the vessel vapour space of each of the vessels with some loss in pressure. The vapours from the vessel vapour space come out of an opening at the top of the vessel which is connected to the vertical bottom under the tray of the next vessel and enter the next vessel under the tray. The flow control valves (FCV) are installed in the pump discharge lines to regulate liquid flow from the bottom of one vessel to the top downcomer area of the succeeding vessel. Liquid recycle streams recycles the excess liquid flow back from the pump discharges to the vessels on the suction side of the pumps maintaining the pump operations at the best efficiency point, reducing backflow load on the pumps.

According to one embodiment of the present invention, the said system is used for a plurality of gas-liquid contact operations. The plurality of said gas-liquid contact operations includes vertical tray column based gas absorption, gas stripping, humidification and dehumidification operations. The plurality of said gas-liquid contact operations facilitates reduced complexity in the said system by excluding the implementation of the reboiler vessel and the condenser vessel. A vapour pressure differential in the plurality of said gas-liquid contact operation is created by putting a compressor in the vapour flow path.

According to one embodiment of the present invention, the presence of the liquid NRVs, the vapour NRVs and the demister in the vessel vapour space avoids the onset of weeping, dumping, entrainment or flooding conditions to make distillation process operating conditions more flexible.

According to one embodiment of the present invention, the vapour stream and the liquid stream move cross-currently with respect to the group of vessels.

According to one embodiment of the present invention, the said system allows a unidirectional flow of vapour from the reboiler vessel to the condenser vessel by placing the vapour NRVs in each of the pipes connecting the vessel vapour space of one vessel to the vertical bottom under the tray of the next vessel. The unidirectional flow of vapours is automatically ensured in case of the valve trays where caps placed on vapour flow openings lift up in case of a positive pressure difference across the tray. The installation of vapour NRVs in the present invention is preferred in the case of the sieve trays to keep the volume below the trays in a pressurized state even when the pressure of preceding vessel decreases. The said arrangement defers the onset of weeping and dumping conditions during operation of the distillation process. However, weeping and dumping conditions may still occur at vastly varied loads. Electrical heaters of suitable rating are integrated with the vapour NRVs and are operated in the case of generation of liquid levels above the vapour NRVs. This vaporizes liquid level build-ups above the vapour NRVs in the case of weeping or dumping conditions. The operation of the electrical heaters is automated by sensing the liquid level build-up above the vapour NRVs through a level transmitter. This arrangement of vapour NRVs, electrical heaters and level transmitters functions equivalent to automatically operated intermediate reboilers integrated with each stage of the present invention converting the liquid leaking through the tray perforation because of low vapour flow to vapours thus increase the vapour flow automatically. The flow of vapour is maintained due to a pressure gradient created between the successive vessels.

According to one embodiment of the present invention, the pumps, the flow control valves and the liquid recycle streams between each pair of interconnected vessels, when operated simultaneously, replicates the liquid flow under gravity in an equivalent vertical tray distillation column. This replication provides a reflux flow by transferring liquid between interconnected vessels. Varying of reflux flow is required during start-up and shut down of distillation process. The said variation of reflux flow is accomplished by varying the openings of the flow control valves installed in interconnected liquid flow pipes between adjacent vessels.

According to one embodiment of the present invention, the vapour flow rate from the reboiler vessel to the condenser vessel is calculated on the basis of the heating load of the reboiler vessel. A suitable cooling load is fixed in the condenser vessel to condense the vapour in it.

According to one embodiment of the present invention, an excessive flow of liquid through the liquid recycle stream back to the preceding vessel along with liquid flow into the vessel from the vessel preceding it provides a rise of liquid levels in the vessel. The rise in liquid levels is transmitted to the flow control valve (FCV) through the level transmitter to provide an enlarged opening of the flow control valve (FCV). The enlarged opening of the FCV increases the liquid flow to the succeeding vessel and maintains the liquid level in the preceding vessel. The liquid levels are maintained at optimum values in the vessels to provide highly efficient performance of the distillation process. The FCV is configured to close completely at a very low liquid level to provide for the complete recycling of the liquid from the pumps to avoid the cavitation of the pumps.

According to one embodiment of the present invention, the arrangement of the said system is done in a linear configuration.

According to another embodiment of the present invention, the arrangement of the said system is done in a snake configuration.

According to another embodiment of the present invention, a vertical tray distillation column is segregated into small vertical segments. These small vertical segments are placed on a horizontal plane with each vertical segment comprising of a more than one stages arranged vertically. The liquid flow from bottom of one distillation segment to the top of the next distillation segment is maintained through the pump, the FCV, the liquid NRV and the liquid recycle stream arrangement similar to horizontal multistage tray distillation system. The liquid flows within a vertical distillation segment by gravity.

According to one embodiment of the present invention, the design for separate liquid and vapour flow paths between stages within a vertical segment is provided. The vapour flow is maintained from one stage to another within a vertical distillation segment through a wide diameter pipe. The liquid downcomers are provided in the form of pipes, wherein the said design enables installation of optional vapour non-return valves along with automatic electrical heaters operating by sensing liquid level above vapour NRVs in the vapour flow paths and non-return valves in liquid flow paths.

FIG. 1 illustrates a schematic diagram of a horizontal multi-stage distillation system, according to one embodiment of the present invention. With respect to FIG. 1, the system comprises a feed stream (101), a distillate stream (102), a residue stream (103), a group of vessels, a plurality of vapour non-return valves (NRVs) (104), a plurality of pumps (105), a plurality of liquid recycle NRVs (106), a liquid stream (107), a vapour stream (108), a plurality of liquid recycle streams (109), a plurality of level transmitters (110), a plurality of flow control valves (FCVs) (111), a plurality of liquid non-return valves (NRVs) (112) and a demister (113). Each vessel is interconnected with succeeding and preceeding vessels. The group of vessels comprises a condenser vessel (114), a reboiler vessel (115), a feed vessel (116), at-least one rectification vessel (117) and at-least one stripping vessel (118). The reboiler vessel (115) is at a higher temperature Tr than temperature Tc of the condenser vessel (114). Vapours are generated in the reboiler vessel (115) to increase its pressure. (A) The condensation of vapour in the condenser vessel (114) results in the generation of low pressure in the condenser vessel. At-least one rectification vessel (117) is provided between the feed vessel (116) and the condenser vessel (114). At-least one stripping vessel (118) is provided between the feed vessel (116) and the reboiler vessel (115). The reboiler vessel (115), the condenser vessel (114), at-least one rectification vessel (117), at-least one stripping vessel (118) and the feed vessel (116) are inter-connected with each other in a sequence so that each of the at-least one rectification vessels (117), each of the at-least one stripping vessels (118) and the feed vessel (116) perform functions equivalent to a single stage of an equivalent vertical tray distillation column. Similar to vertical distillation columns, lower boiling point components are enriched and higher boiling point components are removed in rectification vessels (117) whereas lower boiling point components are removed and higher boiling point components are enriched in the stripping vessels (118). The condenser vessel (114) acts as condenser whereas the reboiler vessel (115) acts as the reboiler of an equivalent tray distillation column. A reflux flow of liquid under gravity in a vertical tray column is exactly replicated by putting pumps (105) of suitably high rating between each pair of interconnected vessels and operating all the pumps in the sequence simultaneously to transfer liquid within the sequence of vessels from one vessel to the next interconnected vessel. A unidirectional flow of the liquid stream (107) is ensured between the interconnected vessels by placing liquid NRVs (106) in the liquid stream (107) in each of the connecting pipes transferring liquid between each pair of interconnected vessels. The placement of the liquid NRVs (106) in the liquid stream (107) avoids backflow of liquid from an inlet or first array inlet 119' of one vessel to the preceding vessel. This prevents backflow load on the plurality of pumps (105) to avoid pump damage. The placement of the liquid NRVs (106) in the liquid stream (107) also provides high flexibility in operational conditions. A vapour space (120) is present at the top of each of the vessel which is equivalent to tray interspacing of an equivalent vertical tray distillation column. The vapour stream (108) is connected to the vertical bottom inlet or second array inlet (119") of each of the vessels and fed into these trays (119) from below. Similar to vertical distillation columns, vapours bubble through the liquid present on the trays and attain vapour-liquid equilibrium with the liquid, enter the vapour space (120) at reduced pressure and occupy the vapour space (120) of each of the vessels increasing the pressure in the vessel vapour space (120). Because of increased pressure, the vapours from the vessel vapour space (120) come out of an opening at the top of the vessel which is connected to the vertical bottom inlet (119") under the tray (119) of the next vessel and enter the next vessel under the tray. Trays are not present in the condenser vessel (114) and the reboiler vessel (115). A demister (113) is provided in the vessel vapour space (120). The demister (113) avoids entrainment of the liquid. A liquid recycle streams (109) connects each of the pump discharges to the vessel on the suction side of the pumps. Each of the liquid recycle streams (109) is fitted with a liquid recycle NRV (106), which prevents backflow of liquid or vapours from the vessel on the suction side of pump (105) to the liquid recycle stream (109). The liquid recycle stream (109) recycles the excess liquid flow back to the vessel on the suction side of the pump (105). The recycling of the excess liquid flow operates the pumps (105) at the best efficiency point, reducing the wear and tear on the pumps (105). A level transmitter (110) is installed in each vessel. The flow control valves (111) are installed in the pump discharge lines to regulate liquid flow from the bottom array outlet 119''' of one vessel to the top downcomer area of the succeeding vessel. Each FCV (111) is integrated with the level transmitter (110) of the preceding vessel. The liquid NRVs (112) in the liquid stream (107) prevent downcomer flooding. Each of the vessels contains liquid at a bottom part and vapour in the vessel vapour space (120). The liquid and vapour present inside each of the vessels in the group of vessels exists at the vapour-liquid equilibrium corresponding to the pressure and temperature conditions in that vessel. The top and bottom of each vessel is connected, respectively, both to the preceding vessel as well as to the succeeding vessel from the horizontally opposite points transferring liquid from bottom of one vessel to top downcomer area of the next vessel.

Figure 2:
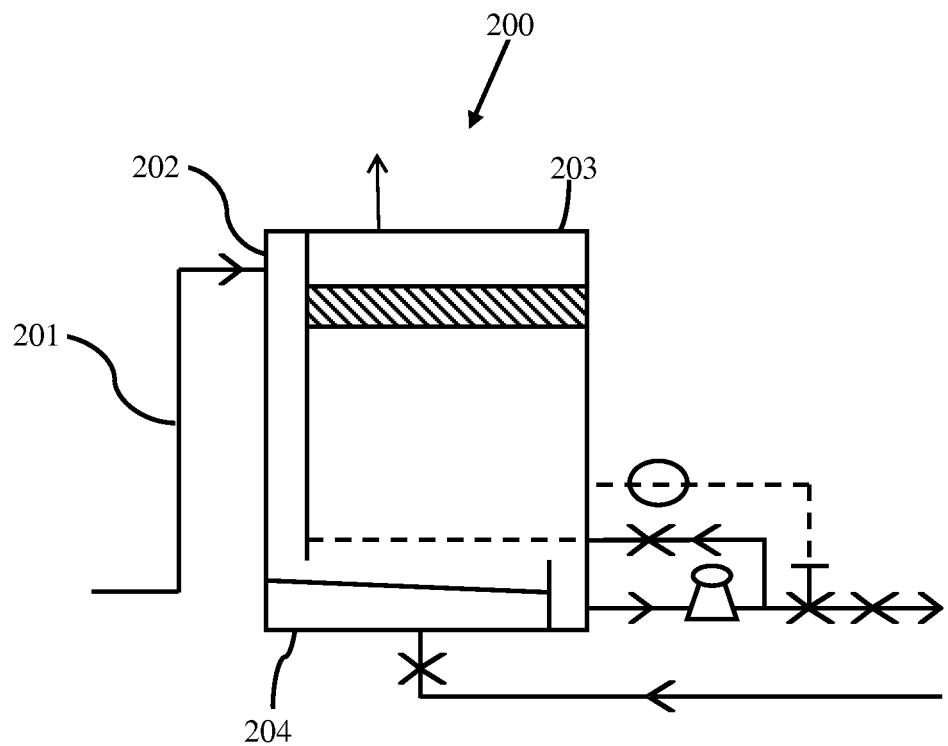
FIG. 2 illustrates a schematic diagram of a single stage of a horizontal multistage tray distillation system, according to another embodiment of the present invention.

FIG. 2 illustrates a schematic diagram of a single stage of the horizontal distillation system, according to one embodiment of the present invention. With respect to FIG. 2, a single stage of the horizontal distillation system (200) implements a downcomer (201) connected to the liquid stream (202). The downcomer (201) is housed within the vessel (203) and allows the liquid to drip down from the top of the vessel (203) onto the tray (204).

Figure 3:
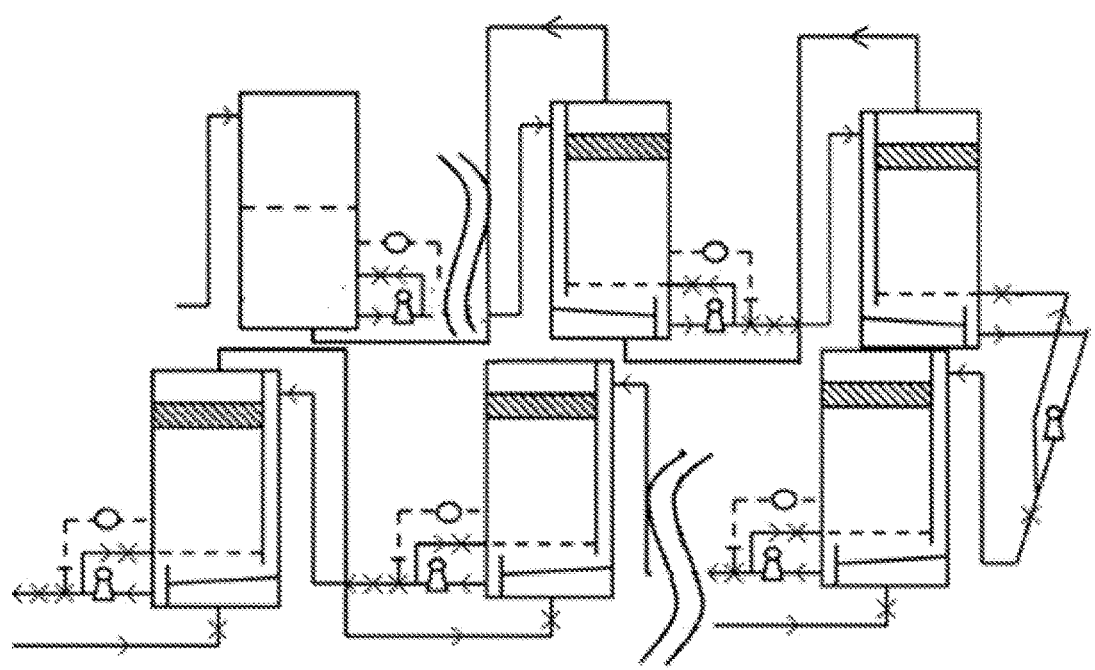
FIG. 3 illustrates a schematic diagram of a horizontal multi-stage distillation system with a snake configuration, according to another embodiment of the present invention.

FIG. 3 illustrates a schematic diagram of a horizontal multi-stage distillation system with a snake configuration, according to one embodiment of the present invention. With the respect to FIG. 3, the group of vessels are arranged in a zig-zag manner. The snake configuration implements all the components as implemented in a linear configuration of the horizontal multi-stage distillation system (referenced from FIG. 1). The snake configuration facilitates a more compact spatial arrangement of the components than the liner configuration.

Figure 4:
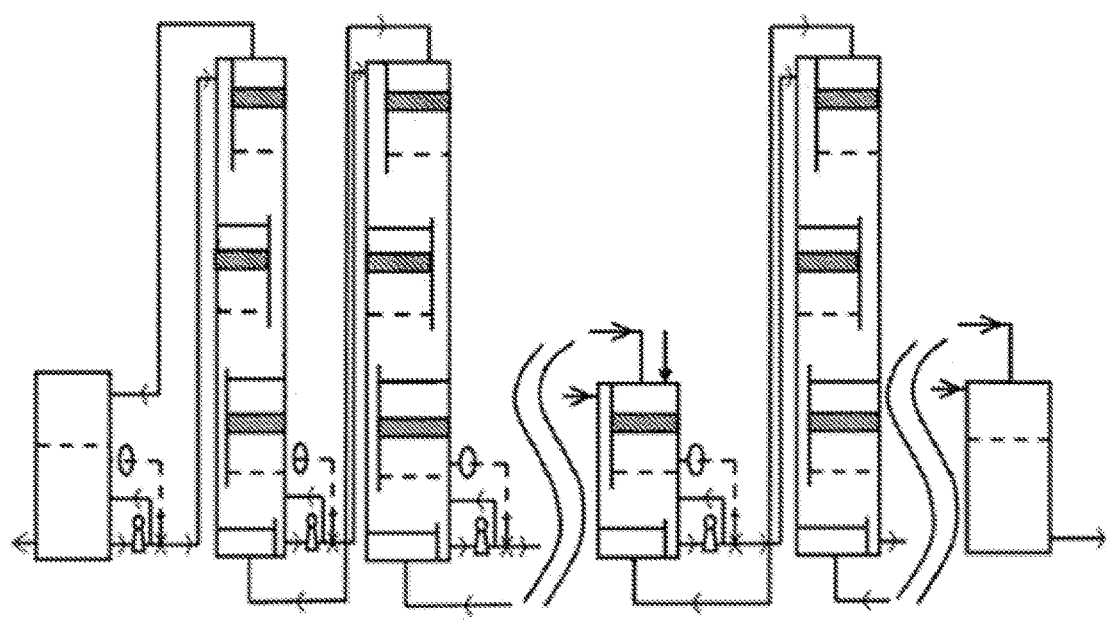
FIG. 4 illustrates a schematic diagram of a segmented distillation system, according to another embodiment of the present invention.

FIG. 4 illustrates a schematic diagram of a segmented distillation system, according to another embodiment of the present invention. With respect to FIG. 4, the segmented distillation system is less operationally flexible than horizontal distillation system because of the absence of liquid and vapour NRVs within the vertical distillation segment. However, the segmented distillation system is more operationally flexible than the conventional vertical tray distillation system because of presence of the liquid NRVs and the vapour NRVs in the flow paths between the two succeeding vertical distillation segments. Furthermore, the energy requirements of the segmented distillation system are less than the horizontal distillation system due to the lesser number of pumps. Furthermore, the energy requirements of the segmented distillation are more than that of the conventional vertical tray distillation system, where liquid flow is entirely due to gravity, which eliminates the need for the pumps. Likewise, other benefits of segmented distillation such as ease and safety of transportation, installation, operation, troubleshooting and maintenance for segmented distillation, lie between that for horizontal distillation and vertical distillation. Also the capital cost reduction for segmented distillation due to lesser dead loads, wind loads and seismic loads as compared to vertical distillation is lower than that for horizontal distillation.

Figure 5:
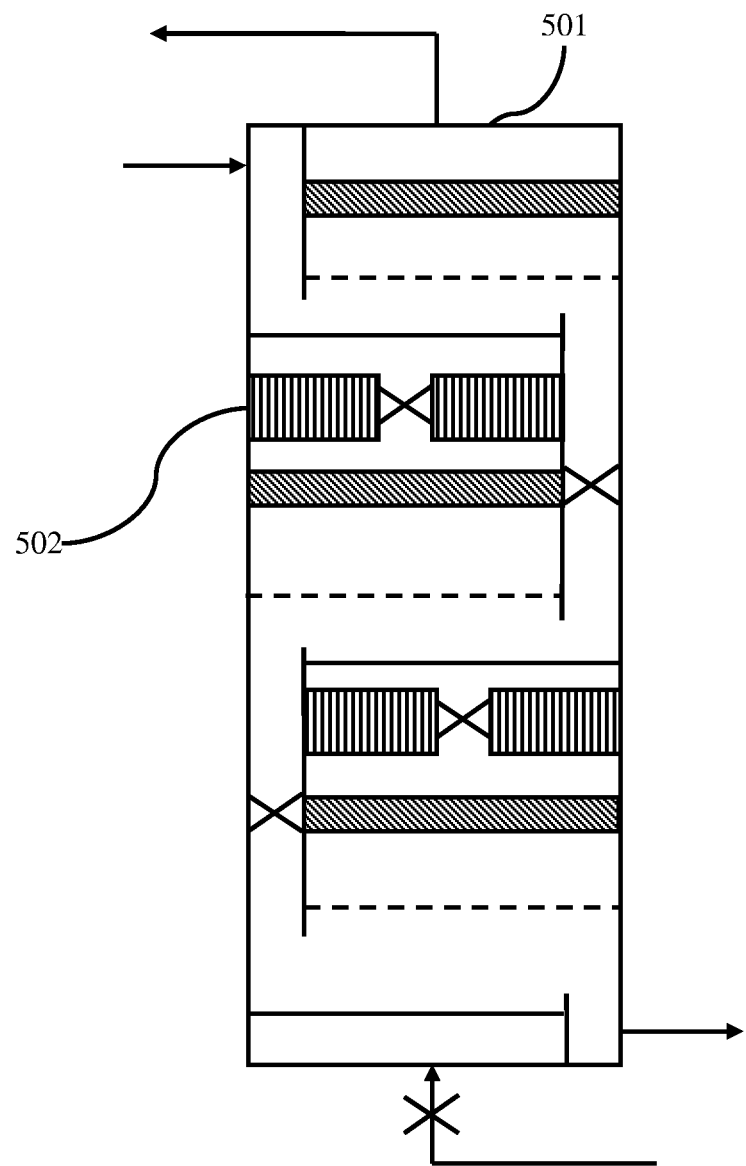
FIG. 5 illustrates a schematic diagram of a single vertical segment of a segmented distillation system with a reduced vapour flow area, according to another embodiment of the present invention.

FIG. 5 illustrates a schematic diagram of a single vertical segment of a segmented distillation system with reduced vapour flow area, according to another embodiment of the present invention. With respect to FIG. 5, a design modification (502) is shown for the vapour flow paths in various stages of the vertical distillation segment with vapour flowing from one stage to the other through a pipe (501). The liquid downcomers are in the form of pipes rather than the open channels. The said design features enable installation of non-return valves in both the vapour and liquid flow paths within a vertical distillation segment ensuring operational flexibility similar to the horizontal distillation system for an equivalent segmented distillation system. However, only the bottommost stage of the vertical distillation segment operates at optimum liquid levels as the said liquid flow through plurality of pump and FCV takes place only from the bottommost stage of a segment, making integration of the FCVs with liquid level transmitters possible only for the bottommost stage.

Figure 6:
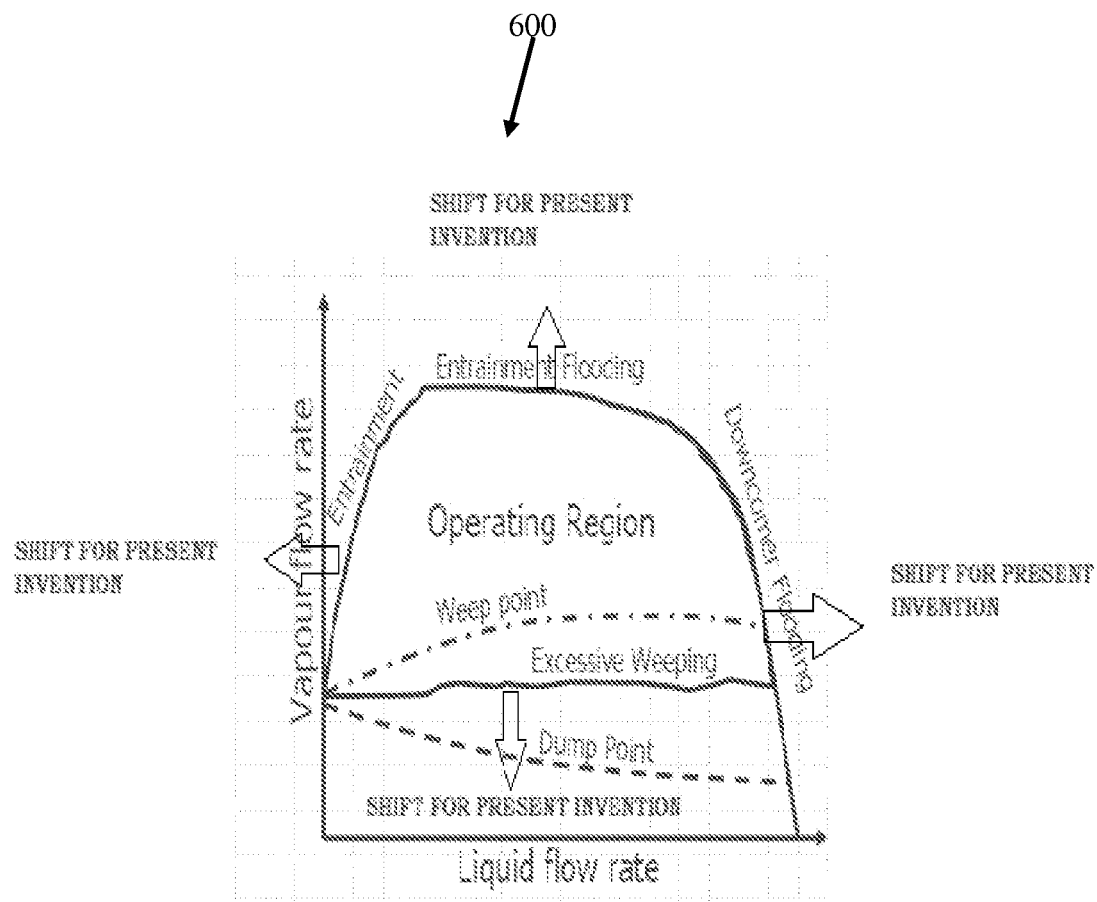
FIG. 6 illustrates a graphical representation of an operating area for a vertical tray distillation system with a curve shift for vapour flow rate vs. liquid flow rate plot according to another embodiment of the invention.

FIG. 6 illustrates a graphical representation of an operating area for a vertical tray distillation system with a curve shift for the vapour flow rate vs. the liquid flow rate plot according to another embodiment of the invention. With respect to FIG. 6, a conventional vertical tray distillation process operates within the vapour and liquid flow rate combinations, which is depicted by an area on vapour flow rate vs. liquid flow rate plot (600). The demisters are preferred in conventional vertical tray columns to avoid liquid entrainment. However, their recurrent disengagement can cause maintenance problems requiring repeated repair work at elevated heights. The demisters can be installed in the individual vessels of the present invention not requiring any repair work at elevated heights during disengagement of demisters. The presence of demisters results in no liquid entrainment at lower liquid flow rates and no entrainment flooding at higher vapour flow rates. Therefore, the entrainment curve for equivalent conventional vertical tray distillation process shifts to the left for the present invention and the entrainment flooding curve for equivalent conventional vertical tray distillation process shifts upwards for the present invention.

At high liquid flow rates and low to high vapour flow rates, the pressure difference between the top part and the bottom part of the tray becomes high enough so that liquid instead of flowing down from the upper tray to the lower tray through the downcomer, starts flowing up from the lower tray to the upper tray through the downcomer because of a high pressure difference countering gravity. Finally, the lower trays become dry and the upper trays become flooded with liquid resulting in very high pressures in the column and resulting in no separation of the feed. This condition is known as the downcomer flooding condition and is shown by the downcomer flooding curve. In the present invention, the pump and valves arrangements are placed in each of the liquid interconnection pipe. This arrangement avoids the backflow of liquid from the vessel on the discharge side of the pumps to the vessel on the suction side of the pumps. The presence of pumps, the FCVs, the recycle streams and the NRVs in the present invention shift the downcomer flooding curve for conventional vertical distillation processes, to the right for the present invention. At low vapour flow rates and high liquid flow rates, the vapour flow through the tray perforations is insufficient to avoid leaking of the liquid from the tray perforations. Under such conditions, the pressure difference between the top part and the bottom part of the tray, along with the liquid pressure drop across the tray perforation, is less than the liquid pressure due to the liquid level in the tray. This results in the leaking of liquid from the tray perforations. This condition is known as weeping and is shown by the weeping curve. In the present invention, the said system allows for a unidirectional flow of vapour from the reboiler vessel to the condenser vessel by placing vapour NRVs in each of the pipes connecting the vessel vapour space of one vessel to the vertical bottom under the tray of the next vessel. Unidirectional flow of vapours is automatically ensured in the case of valve trays where caps placed on vapour flow openings lift up in case of positive pressure difference across the tray. However, sieve trays are less expensive, less prone to corrosion and fouling and require less maintenance. The installation of vapour NRVs in the present invention is preferred in the case of the sieve trays to keep the volume below the trays in pressurized state even when the pressure of preceding vessel decreases. This defers the onset of weeping and dumping conditions during operation of distillation process. However, weeping and dumping conditions may still occur at vastly varied loads. Electrical heaters of suitable ratings are integrated with vapour NRVs and are operated in case of the build-up of liquid levels above the vapour NRVs. The placing of electric heaters vaporizes the liquid level build-ups above the vapour NRVs in case of weeping or dumping conditions. The operation of electrical heaters can be automated by sensing liquid level build-up above the vapour NRVs. In vertical tray distillation column, the vapour NRVs cannot be installed due to the unsuitable design of the column. Therefore, the presence of the vapour NRVs along with the above described arrangement in the present invention shifts the weeping curve for an equivalent vertical distillation process, downwards.

Therefore, the operating region on vapour flow rate vs. liquid flow rate plot for an equivalent vertical tray distillation column swells for the present invention as shown in FIG. 6 enabling the present invention to operate at more relaxed flow conditions reducing the turndown time and enabling implementation of less expensive design features for the present invention in comparison with equivalent vertical tray distillation column.

As the present invention is based on same theoretical principals as a conventional distillation process therefore, all the conventional calculation procedures applicable to the vertical tray distillation process such as the McCabe-Thiele method and the Ponchon-Savarit method, are applicable to the present invention. Furthermore, the various calculation procedures used for multi-component distillation in the vertical tray distillation columns are also applicable to the present invention. In addition, all kinds of detailed design calculations applicable to vertical tray distillation columns such as tray design, tray inter-space calculation, column diameter calculations, reboiler calculations etc., are applicable to the present invention. In addition, start-up, shut down and normal operating procedures for the present invention are similar to those for vertical tray distillation columns in theory, requiring suitable variations during practical implementation due to the difference in the designs of the two systems. The present invention can perform any type of distillation operation that can be performed in a vertical tray distillation column.

The present invention can include one or multiple intermediate reboilers, one or multiple intermediate condensers and multiple feed stages as per the requirement of distillation process. The design of reboilers and condensers used in the present invention can be different from the basic design proposed in the present invention. Also, the present invention can be used universally to perform all kinds of tray distillation operations such as continuous distillation, extractive distillation, azeotropic distillation, batch distillation, semi-batch distillation etc. In addition, the configurations and arrangements proposed in the present invention can be used in other gas-liquid contact operations such as gas absorption, gas stripping, humidification, de-humidification etc., which are conventionally carried out in vertical tray columns.

G) ADVANTAGES OF THE INVENTION

The horizontal design of the present invention makes it extremely inexpensive, easy and safe to transport, install, operate, maintain and troubleshoot, compared with an equivalent vertical tray distillation column. In addition, its horizontal design, with each small vessel acting equivalent to a stage of an equivalent vertical distillation column, enables the implementation of a number of design modifications which are otherwise not possible in a vertical tray distillation column. The modular design of the present invention with different liquid and vapour flow paths enables installation of liquid NRVs in liquid flow paths and vapour NRVs in vapour flow paths without elaborate design modifications and installation of demisters in the vessel vapour spaces not requiring any maintenance work at elevated heights. This results in swelling of operating region of an equivalent vertical tray distillation column on vapour flow rate vs. liquid flow rate plot for the present invention reducing the turndown time due to varied loads for the present invention in comparison with equivalent vertical tray distillation column. Else, because of relaxed flow conditions, higher vapour flow rates are possible for the present invention in comparison with equivalent vertical tray columns resulting in smaller shell diameters for the present invention. Also, different vessels for the present invention can be designed with different dimensions and with different internals. Such design flexibility is sometimes desirable in vertical tray columns but cannot be implemented practically.

These and other similar design modifications can make the present invention more flexible, more efficient and less expensive compared with equivalent vertical tray distillation processes.

A vertical tray distillation column has to be designed considering dead loads, seismic loads and wind loads due to its vertical design. The present invention can be designed without considering dead loads, seismic loads and wind loads as it consists of small interconnected vessels placed horizontally. This reduces the shell thickness requirement for the present invention compared with the equivalent vertical tray distillation column. In addition, a costly foundation needs to be laid to support a vertical tray distillation column. This component can be avoided for the present invention due to its horizontal design. The reduced shell thickness and the lack of requirement for a foundation results in reduced capital cost for the present invention.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

I claim:

1. An apparatus for gas-liquid contact operations, comprising:
    a first vessel having a first vessel body with a first top end and a first bottom end, said first vessel having a first pressure in said first vessel body;
    a second vessel having a second vessel body with a second top end and a second bottom end, said second vessel having a second pressure in said second vessel body, said first pressure being less than said second pressure;
    at least one array vessel having an array vessel body with an array top end and an array bottom end, said at least one array vessel being comprised of a horizontal perforated tray in said array bottom end, a first array inlet at said array top end above the perforated tray, a second array inlet at said array bottom end below the perforation tray, and an array pump in fluid connection between said at least one array vessel and said second vessel,
    wherein said first vessel, said at least one array vessel and said second vessel define a gas stream with a gas stream direction through said second vessel, said second array inlet at said array bottom end, the perforated tray of said at least one array vessel, said array top end of said at least one array vessel, and said first vessel,
    wherein said first vessel, said at least one array vessel and said second vessel define a liquid stream with a liquid stream direction through said first vessel, said first array inlet at said array top end, the perforated tray of said at least one array vessel, said array bottom end of said at least one array vessel, said second top end of said second vessel, and said second vessel, and
    wherein said array pump is in fluid connection with said second vessel and said at least one array vessel, said liquid stream being further defined by said array pump, said liquid stream direction being through said first vessel, said at least one array vessel, said array pump, said at least one array vessel again, and said second vessel; and
        an array level transmitter within said array vessel body and in communication with said array bottom end adjacent to the perforated tray and said array pump, said liquid stream being further defined by said array pump, said liquid stream direction being through said first vessel, said at least one array vessel, said array pump according to said array level transmitter as a liquid recycle stream through a flow control valve, said at least one array vessel above said perforated tray and said array bottom end as said liquid recycle stream, said array pump again as said liquid stream again, said second top end of said second vessel, and said second vessel,
    wherein said array pump is positioned after a bottom array outlet and before said flow control valve and said second vessel, said liquid recycle stream in said array bottom end adjacent to the perforated tray being cooperative with said liquid stream at said first array inlet as at said array top end to form said liquid stream at said bottom array outlet.

2. The apparatus, according to claim 1, further comprising:
    a flow control valve between said array pump and said second vessel, said liquid stream being further defined by said flow control valve, said liquid stream direction being through said first vessel, said at least one array vessel, said array pump, said flow control valve, said at least one array vessel again, said array pump again, said flow control valve again, said second top end of said second vessel, and said second vessel.

3. The apparatus, according to claim 1,
    wherein said at least one array vessel comprises an additional horizontal perforated tray above said horizontal perforated tray, said gas stream direction being through said second vessel, said horizontal perforated tray and said additional horizontal perforated tray of said at least one array vessel, and said first vessel, and
    wherein said liquid stream direction is through said first vessel, said array top end of said at least one array vessel, past said additional horizontal perforated tray of said at least one array vessel, past said horizontal perforated tray of said at least one array vessel, said second top end of said second vessel, and said second vessel.

4. The apparatus, according to claim 1, wherein said liquid stream is continuous, when said liquid stream direction is through said first vessel, said at least one array vessel, said array pump, said at least one array vessel again, said second top end of said second vessel, and said second vessel.

5. The apparatus, according to claim 1, further comprising:
    a non-return vapor valve between said second vessel and said at least one array vessel, said gas stream being defined by said non-return vapor valve, said gas stream direction being through said second vessel, said non-return vapor valve, said at least one array vessel, and said first vessel; and
    a non-return liquid valve between said array pump and said second vessel, said liquid stream being defined by said non-return liquid valve, said liquid stream direction being through said first vessel, said at least one array vessel, said array pump, said non-return liquid valve, said second top end of said second vessel, and said second vessel.

6. The apparatus, according to claim 1, further comprising:
    a demister within said at least one array vessel body, said gas stream being defined by said demister, said gas stream direction being through said second vessel, said at least one array vessel, said demister within said at least one array vessel, and said first vessel.

7. The apparatus, according to claim 1, wherein said horizontal perforated tray in said array bottom end defines said gas stream and said liquid stream in said at least one array vessel by one of the group consisting of: gas absorption, gas stripping, humidification, and dehumidification.

8. An apparatus for gas-liquid contact operations, comprising:
a first vessel having a first vessel body with a first top end and a first bottom end, said first vessel having a first pressure in said first vessel body, said first vessel being a condenser vessel;
a second vessel having a second vessel body with a second top end and a second bottom end, said second vessel having a second pressure in said second vessel body, said first pressure being less than said second pressure, said second vessel being a reboiler vessel;
a feed vessel having a feed vessel body with a feed top end and a feed bottom end, said feed vessel being comprised of a feed horizontal perforated tray in said feed bottom end, a first feed inlet at said feed top end above the feed perforated tray, a second feed inlet at said feed bottom end below the feed perforation tray, and a feed pump in fluid connection between said feed vessel and said second vessel,
wherein said first feed inlet at said feed top end is in fluid connection with said feed vessel body,
wherein said first vessel, said feed vessel and said second vessel define a gas stream with a gas stream direction through said second vessel, said second feed inlet at said feed bottom end, the feed perforated tray of said feed vessel, said feed top end, and said first vessel,
wherein said first vessel, said feed vessel and said second vessel define a liquid stream with a liquid stream direction through said first vessel, said first feed inlet at said feed top end, the feed perforated tray of said feed vessel, said feed bottom end of said feed vessel, said second top end of said second vessel, and said second vessel, and
wherein said feed pump is in fluid connection with said second vessel and said feed vessel, said liquid stream being further defined by said feed pump, said liquid stream direction being through said first vessel, said feed vessel, said feed pump, said feed vessel again, and said second vessel; and
a feed level transmitter within said feed vessel body and in communication with said feed bottom end adjacent to the feed perforated tray and said feed pump, said liquid stream being further defined by said feed pump, said liquid stream direction being through said first vessel, said feed vessel, said feed pump according to said feed level transmitter as a feed liquid recycle stream through a feed flow control valve, said feed vessel above said feed perforated tray and said feed bottom end as said feed liquid recycle stream, said feed pump again as said liquid stream again, said second top end of said second vessel, and said second vessel,
wherein said feed pump is positioned after a bottom feed outlet and before said feed flow control valve and said second vessel, said feed liquid recycle stream in said feed bottom end adjacent to the feed perforated tray being cooperative with said liquid stream at said first feed inlet at said feed top end to form said liquid stream at said bottom feed outlet.

9. The apparatus, according to claim 8, further comprising:
a rectifier vessel having a rectifier vessel body with a rectifier top end and a rectifier bottom end, said rectifier vessel being comprised of a rectifier horizontal perforated tray in said rectifier bottom end, a first rectifier inlet at said rectifier top end above the rectifier perforated tray, a second rectifier inlet at said rectifier bottom end below the rectifier perforation tray, and a rectifier pump in fluid connection between said rectifier vessel and said feed vessel, said rectifier vessel being in fluid connection between said feed vessel and said first vessel,
wherein said gas stream defined by said first vessel, said rectifier vessel, said feed vessel, and said second vessel has a gas stream direction through said second vessel, said feed vessel, said second rectifier inlet at said rectifier bottom end, the rectifier perforated tray of said rectifier vessel, said rectifier top end, and said first vessel,
wherein said liquid stream defined by said first vessel, said rectifier vessel, said feed vessel, and said second vessel has a liquid stream direction through said first vessel, said first rectifier inlet at said rectifier top end, the rectifier perforated tray of said rectifier vessel, said rectifier bottom end of said rectifier vessel, said feed vessel, said second top end of said second vessel, and said second vessel, and
wherein said feed pump is in fluid connection with said second vessel,
wherein said rectifier pump is in fluid connection with said feed vessel and said rectifier vessel,
wherein said liquid stream is further defined by said rectifier pump, said liquid stream direction being through said first vessel, said rectifier vessel, said rectifier pump, said rectifier vessel again, said feed vessel, said feed pump, said feed vessel again, and said second vessel.

10. The apparatus, according to claim 8, further comprising:
a stripping vessel having a stripping vessel body with a stripping top end and a stripping bottom end, said stripping vessel being comprised of a stripping horizontal perforated tray in said stripping bottom end, a first stripping inlet at said stripping top end above the stripping perforated tray, a second stripping inlet at said stripping bottom end below the stripping perforation tray, and a stripping pump in fluid connection between said stripping vessel and said second vessel, said stripping vessel being in fluid connection between said feed vessel and said second vessel,
wherein said gas stream defined by said first vessel, said feed vessel, said stripping vessel, and said second vessel has a gas stream direction through said second vessel, said second stripping inlet at said stripping bottom end, the stripping perforated tray of said stripping vessel, said stripping top end, said feed vessel, and said first vessel,
wherein said liquid stream defined by said first vessel, said feed vessel, said stripping vessel, and said second vessel has a liquid stream direction through said first vessel, said feed vessel, said first stripping inlet at said stripping top end, the stripping perforated tray of said stripping vessel, said stripping bottom end of said stripping vessel, said second top end of said second vessel, and said second vessel, and
wherein said stripping pump is in fluid connection with said feed vessel through said stripping vessel, wherein said stripping pump is in fluid connection with said second vessel and said stripping vessel, wherein said liquid stream is further defined by said stripping pump, said liquid stream direction being through said first vessel, said feed vessel, said feed pump, said feed vessel again, said stripping vessel, said stripping pump, said stripping vessel again, and said second vessel.

11. The apparatus, according to claim 9, wherein said rectifier vessel comprises an additional rectifier horizontal perforated tray above said rectifier horizontal perforated tray, said gas stream direction being through said second vessel, said rectifier horizontal perforated tray and said additional rectifier horizontal perforated tray of said rectifier vessel, and said first vessel, and wherein said liquid stream direction is through said first vessel, said rectifier top end of said rectifier vessel, past said additional rectifier horizontal perforated tray of said rectifier vessel, past said rectifier horizontal perforated tray of said rectifier vessel, said second top end of said second vessel, and said second vessel.

12. The apparatus, according to claim 10, wherein said stripping vessel comprises an additional stripping horizontal perforated tray above said stripping horizontal perforated tray, said gas stream direction being through said second vessel, said stripping horizontal perforated tray and said additional stripping horizontal perforated tray of said stripping vessel, and said first vessel, and wherein said liquid stream direction is through said first vessel, said stripping top end of said stripping vessel, past said additional stripping horizontal perforated tray of said stripping vessel, past said stripping horizontal perforated tray of said stripping vessel, said second top end of said second vessel, and said second vessel.

13. The apparatus, according to claim 8, further comprising:

a flow control valve between said feed pump and said second vessel, said liquid stream being further defined by said flow control valve, said liquid stream direction being through said first vessel, said feed vessel, said feed pump, said flow control valve, said feed vessel again, said feed pump again, said flow control valve again, said second top end of said second vessel, and said second vessel.

14. The apparatus, according to claim 8, wherein said liquid stream is continuous, when said liquid stream direction is through said first vessel, said feed vessel, said feed pump, said feed vessel again, said second top end of said second vessel, and said second vessel.

15. The apparatus, according to claim 8, further comprising:

a non-return vapor valve between said second vessel and said feed vessel, said gas stream being defined by said non-return vapor valve, said gas stream direction being through said second vessel, said non-return vapor valve, said feed vessel, and said first vessel, and through said feed inlet, said feed vessel and said first vessel.

16. The apparatus, according to claim 8, further comprising:

a non-return liquid valve between said feed pump and said second vessel, said liquid stream being defined by said non-return liquid valve, said liquid stream direction being through said first vessel, said feed vessel, said feed pump, said non-return liquid valve, said second top end of said second vessel, and said second vessel.

17. The apparatus, according to claim 8, further comprising:

a demister within said at least one feed vessel body, said gas stream being defined by said demister, said gas stream direction being through said second vessel, said feed vessel, said demister within said feed vessel, and said first vessel, and through said feed inlet, said feed vessel, said demister within said feed vessel, and said first vessel.

18. The apparatus, according to claim 8, wherein said feed horizontal perforated tray in said feed bottom end defines said gas stream and said liquid stream in said feed vessel by one of the group consisting of: continuous distillation, extractive distillation, batch distillation, semi-batch distillation, reactive distillation, azeotropic distillation and vacuum distillation.

* * * * *